(12) United States Patent
Scrafford et al.

(10) Patent No.: US 8,849,618 B2
(45) Date of Patent: Sep. 30, 2014

(54) METHOD AND APPARATUS FOR DETERMINING PLACEMENT OF DEVICES BASED ON A BUILDING LAYOUT

(75) Inventors: Matthew O. Scrafford, Fairport, NY (US); Jason C. Tsongas, Rochester, NY (US); Ray U. Merriam, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 584 days.

(21) Appl. No.: 13/194,228

(22) Filed: Jul. 29, 2011

(65) Prior Publication Data

US 2013/0030770 A1    Jan. 31, 2013

(51) Int. Cl.
G06F 17/50    (2006.01)

(52) U.S. Cl.
CPC ........ G06F 17/5004 (2013.01); G06F 2217/02 (2013.01)
USPC ............................................................ 703/1

(58) Field of Classification Search
CPC .......................... G06F 17/5004; G06F 2217/02
USPC ............................................................ 703/1
See application file for complete search history.

(56) References Cited

U.S. PATENT DOCUMENTS 8,099,237 B2 * 1/2012 Mays et al. .................. 701/434
2010/0324950 A1 * 12/2010 Merriam et al. ................. 705/7

* cited by examiner

*Primary Examiner* — Aniss Chad
(74) *Attorney, Agent, or Firm* — Ronald E. Prass, Jr.; Prass LLP

(57) ABSTRACT

A method and apparatus for determining placement of one or more devices using a building layout is disclosed. The method may include generating a map layer based on the building layout. A zone definition that includes identification of available zones and access characteristics of each of the available zones is received. A density definition that includes identification of available density levels and usage characteristics of each of the density levels is received. The placement of the one or more devices in the available zones is enabled based on associating the zone definition and the density definition with the map layer.

20 Claims, 9 Drawing Sheets

| NUMBER | COLOR | NAME | ACCESS | ALLOW PRINTERS |
|---|---|---|---|---|
| 1 | RED | SECURE ZONE | 1,2,3,4,5,6 | YES |
| 2 | ORANGE | BADGE LEVEL C ZONE | 2,3,4,5,6 | YES |
| 3 | YELLOW | BADGE LEVEL B ZONE | 3,4,5,6 | YES |
| 4 | BEIGE | BADGE LEVEL A ZONE | 4,5,6 | YES |
| 5 | BLUE | COMMON AREA 1 | N/A | NO |
| 6 | PURPLE | COMMON AREA 2 | N/A | YES |

| NUMBER | COLOR | NAME | USERS | INCREMENT |
|---|---|---|---|---|
| 1 | RED | MORE DENSE | 1 | SQUARE YARDS |
| 2 | BLUE | LESS DENSE | 0.1 | SQUARE YARDS |

…
METHOD AND APPARATUS FOR DETERMINING PLACEMENT OF DEVICES BASED ON A BUILDING LAYOUT

BACKGROUND

Disclosed herein is a method and apparatus for floor plan mapping for efficient placement of machines.

Current floor plan mapping application for placement of machines uses imported floor plans to assess the overall building layout. Using the building layout, devices are placed in locations based on "best guess". This process relies on human intervention for placement and requires all users within a customer location to have access to all areas which is often not the case.

SUMMARY

A method and apparatus for determining proper locations for placement of devices using a building layout is disclosed. The method may include augmenting an existing building layout with zones to designate user accessibility rules along with definition of barriers to user flow and density of users. When the zones and density have been defined, the overall placement of devices may be automatically generated for an optimal quantity and location of devices.

DETAILED DESCRIPTION

Figure 1:
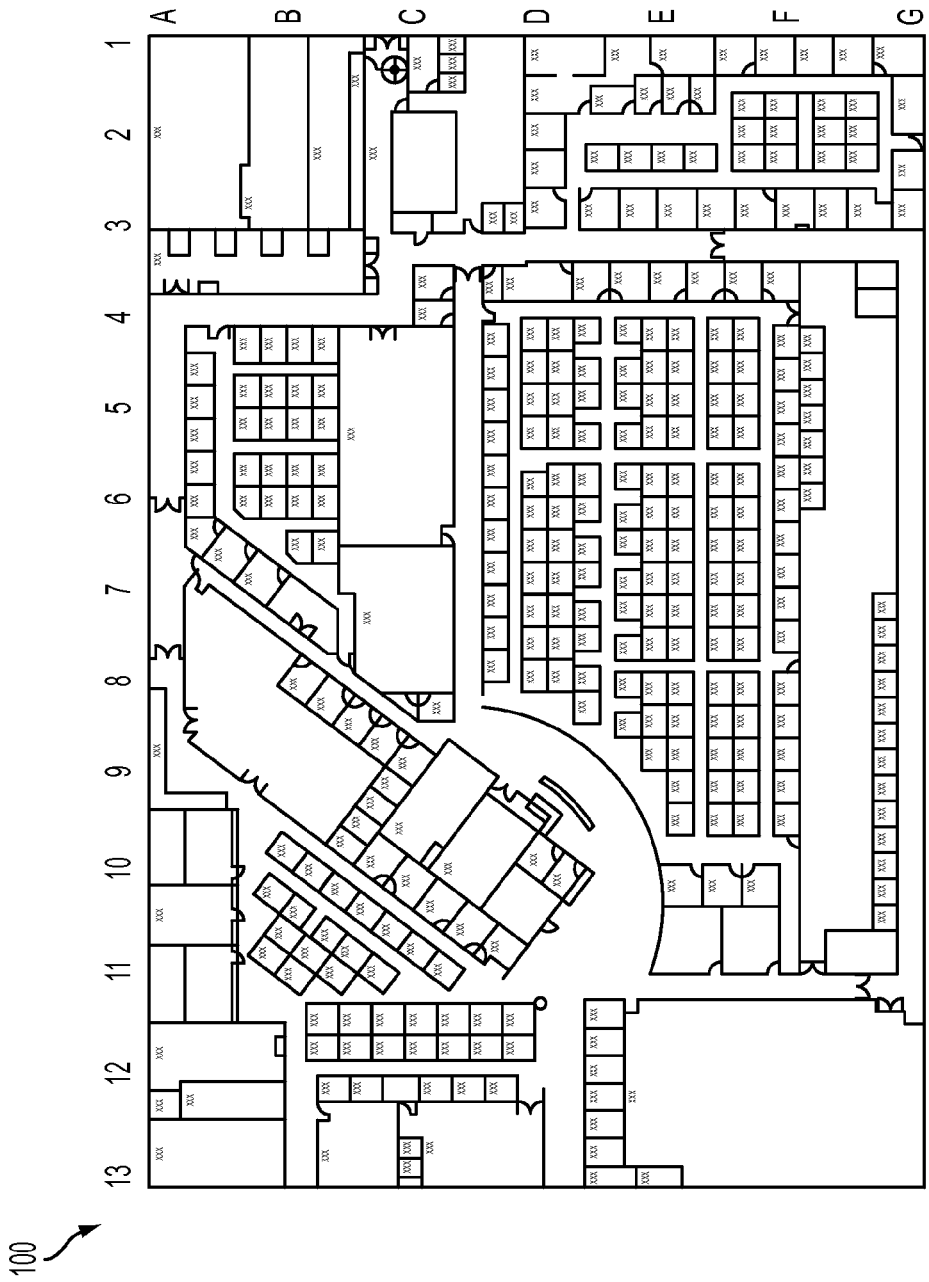
FIG. 1 is an exemplary diagram of a map layer in accordance with one possible embodiment of the disclosure.

Aspects of the embodiments disclosed herein relate to a method and apparatus for determining proper placement of devices based on availability of space and based on accessibility to the devices by users.

The disclosed embodiments may include a method and apparatus for the placement of one or more devices using a building layout. The method may include generating a map layer based on the building layout. A zone definition that includes identification of available zones and access characteristics of each of the available zones is received. A density definition that includes identification of available density levels and usage characteristics of each of the density levels is received. The placement of the one or more devices in the available zones is enabled based on associating the zone definition and the density definition with the map layer.

The disclosed embodiments may further include a system for determining the placement of the one or more devices. The system may include a map layer generating module that is configured to generate a map layer based on a building layout. The system also includes a zone layer generating module and a density layer generating module. The zone layer generating module is coupled with the map layer generating module and is configured to generate a zone layer based on a zone definition and the map layer. The density layer generating module coupled is also coupled with the map layer generating module and is configured to generate a density layer based on a density definition and the map layer. The system then includes a device placement module which is configured to provide information about the placement of the one or more devices using the map layer, the zone layer and the density layer.

The disclosed embodiments may further include computer-readable medium storing instructions for controlling a computing device for determining the placement of devices using a building layout. The instructions may include generating a map layer based on the building layout, generating a zone layer based on a zone definition and the map layer, and generating a density layer based on a density definition and the map layer. The zone definition includes identification of available zones and access characteristics of each of the available zones. The density definition includes identification of available density levels and usage characteristics of each of the density levels. The instructions further include enabling placement of one or more devices in the available zones based on the map layer, the zone layer and the density layer.

Thus, the disclosed embodiments concern the placement of one or more devices using a building layout such that the placement of the devices can be achieved in an efficient manner. The efficient placement of the devices may reduce unnecessary movements or relocations of the devices resulting in better customer satisfaction and overall installation costs, especially when the placement of the devices is under an installation contract.

FIG. 1 is an exemplary diagram of a map layer in accordance with one possible embodiment of the disclosure. Map layer 100 may be generated by a floor planning application based on a basic building layout. The floor planning application may include an interface to enable an operator to import the basic building layout. The interface may include features to enable the operator to input floor configurations and generate the map layer 100. For some embodiments, the map layer 100 may include horizontal legend (e.g., numbers from 1 to 13) and vertical legend (e.g., letters from A to G). The horizontal legend and the vertical legend form a matrix or grid to help the user identify specific location in the map layer 100 based on an intersection of a vertical line and a horizontal line.

Figure 2:
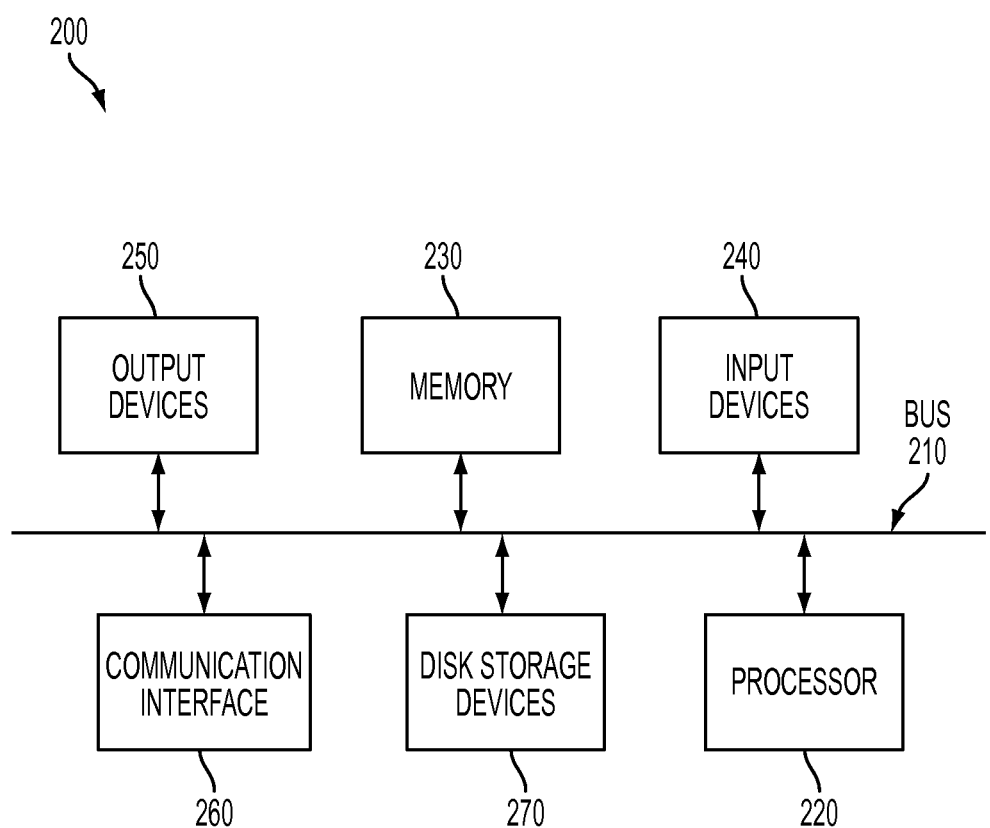
FIG. 2 is an exemplary block diagram of a computer system that may be used with a floor planning application in accordance with one possible embodiment of the disclosure.

FIG. 2 is an exemplary block diagram of a computer system that may be used with the floor planning application in accordance with one possible embodiment of the disclosure. The computer system 200 may include a bus 210, a processor 220, a memory 230, input devices 240, output devices 250 and communication interface 260. The bus 210 may permit communication among the components of the computer system 200. The processor 220 may include at least one conventional processor or microprocessor that interprets and executes instructions. The memory 230 may be a random access memory (RAM) or another type of dynamic storage device that stores information and instructions for execution by processor 220. The memory 230 may also include a read-only memory (ROM) which may include a conventional ROM device or another type of static storage device that stores static information and instructions for processor 220. Storage device 270 may augment the memory 230 and may include any type of storage media, such as, for example, magnetic or optical recording media and its corresponding drive. The communication interface 260 may include any mechanism that facilitates communication via a network. For example, the communication interface 260 may include a modem. Alternatively, the communication interface 260 may include mechanisms for assisting in communications with other devices and/or systems. The input devices 240 may include one or more conventional mechanisms that enable an operator of the floor planning application to input information to and interact with the computer system 200. This may include, for example, a keyboard, a display, a mouse, a pen, a voice recognition device, touchpad, buttons, etc., for example. The output devices 250 may include one or more conventional mechanisms that enable the operator to view information generated by the computer system 200. For example, this may include the zone layer and the density layer generated by the floor planning application and displayed on a display or printed on a printer. The computer system 200 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

The computer system 200 illustrated in FIG. 2 and the related discussion are intended to provide a brief, general description of a suitable communication and processing environment in which the disclosure may be implemented. Although not required, the disclosure will be described, at least in part, in the general context of computer-executable instructions, such as program modules, being executed by the computer system 200, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The floor planning application may be configured to operate using layered approach which consists of the map layer 100, the zone layer 305, and the density layer 310. The three layers are illustrated in FIG. 3A and may be used together to enable placement of a device (e.g., a printer) in a particular location such that the device will be used effectively.

Figures 3A, 3B, 3C:
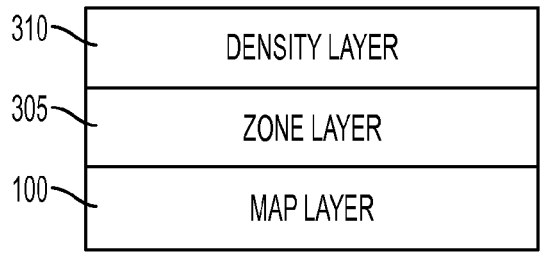
FIG. 3A is an exemplary block diagram of various layers that may be used in implementing a floor planning application in accordance with one possible embodiment of the disclosure.
FIG. 3B is an exemplary zone definition in accordance with one possible embodiment of the disclosure.
FIG. 3C is an exemplary density definition in accordance with one possible embodiment of the disclosure.

FIG. 3B is an exemplary zone definition in accordance with one possible embodiment of the disclosure. For some embodiments, different zones may be defined using the interface associated with the floor planning application. For example, there may be secured zones, common zones, and zones that certain types of devices (e.g., printers) cannot be placed. The zones may be associated with a predefined set of rules. For example, access rules may be defined to enable the placement of devices based on how the users are able to access the zones, and printer rules may be defined to enable placement of a printer based on whether a printer can be placed in a particular zone. Referring to FIG. 3B, zone definition 320 includes multiple columns representing zone number or identification 330, zone color 335, zone name 340, zone access 345, and zone device 350. Each zone may be associated with a zone coordinates. The floor planning application may display the zone coordinates of each zone on the layout to ensure that no rule is violated.

The zone number or identification column 330 lists a total number of defined zones and the identification assigned to each zone. The zone number is used in the designation of access. The zone color column 335 lists the color assigned to each zone. The zone color may provide a graphical representation of the zone. The zone name column 340 lists the zone name assigned to each zone. The zone names may describe the security level of each zone. The zone name may help the operator understand the characteristic of the zones. The zone access column 345 lists the security level or access rights that a user may need to have to access a particular zone. For example, the access rights define if a user in that zone can print to printers outside of their zone, or if they can only print to a device that is placed within their assigned zone. In the current example, there may be six different access rights or security levels. When a zone can be accessed by any user regardless of the security level assigned to that user, that zone may be listed in the zone access column 345 as N/A or some notations that indicate the zone is open for access by any user. The zone device column 350 lists whether it is acceptable to install a certain device (e.g., printer) in that zone. For example, a user with the Badge Level A is given access levels 4, 5 and 6, while a user with the Badge Level C may have access to more zones because that user is given access levels 2, 3, 4, 5 and 6. For some embodiments, the floor planning application may include options to enable the user to enable or disable access to one or more devices placed in the zones such that some users in a zone may not be able to access the devices located in the same zone.

FIG. 3C is an exemplary density definition in accordance with one possible embodiment of the disclosure. For some embodiments, different density levels may be defined using the interface associated with the floor planning application. For example, there may be a high or more density level (e.g., more users) and a low or less density level (e.g., less users). The density levels may be associated with a predefined set of rules. The density level may be used to define the usage volume for a particular zone or an area of more than one zone or a combination of both usage volume and user density. Referring to FIG. 3C, the density definition 355 includes multiple columns representing density number or identification 360, density color 365, density level name 370, density quantity 375, and density unit 380. The density number or identification column 360 lists a total number of defined density levels and the identification assigned to each density level. The density color column 365 lists the color assigned to each density level. The density level name column 370 lists the name assigned to each density level. The density quantity column 375 and the density unit column 380 list the number of user per density unit (e.g., square yard).

Figure 4:
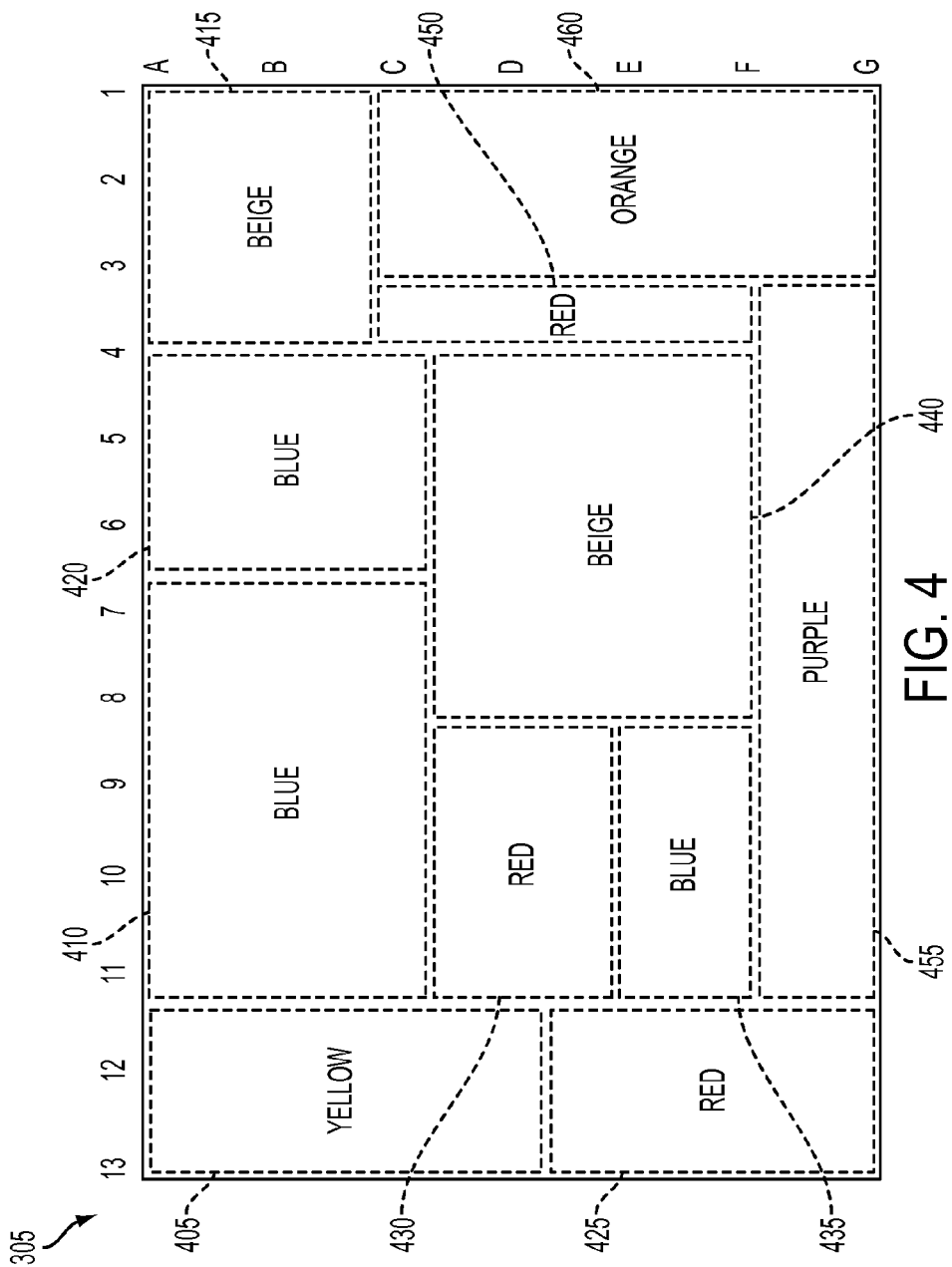
FIG. 4 is an exemplary block diagram of a zone layer that corresponds to a map layer in accordance with one possible embodiment of the disclosure.

FIG. 4 is an exemplary block diagram of a zone layer that corresponds to a map layer in accordance with one possible embodiment of the disclosure. Using the zone definition information such as the one described in FIG. 3B, the floor planning application may augment the map layer 100 and generate the zone layer 305. For some embodiments, the user may use the interface to provide details about hard walls, soft walls and any barriers that would be used to form the different zones to accommodate possible flow and placement of devices. In the current example, the zone layer 305 includes eleven zones 405-460, with each zone being associated with a zone color and covering a different area of the map layer 100. For example, the zone 410 is associated with the zone color blue to indicate that it covers a common area and is open for access by any user; the zone 440 is associated with the zone color beige to indicate that it covers a more restricted area and is open for access only to the users who have the higher security levels 4, 5 and 6 (as illustrated in FIG. 3B). Further, the zone layer 305 indicates that no printer device can be placed in the zones 410, 420 and 435 because those zones are associated with the zone color blue.

The zone layer 305 may be used to define movement criteria between zones, which would allow for improved placement of the devices. For example, a user with Badge Access A may not be able to access any zones outside of their assigned beige zones 415 and 440 so multiple devices may be needed for those users since the zones defined for Badge Access A (e.g., zones 415 and 440) may be separated by other zones (e.g., zones 420 and 450).

Figure 5A:
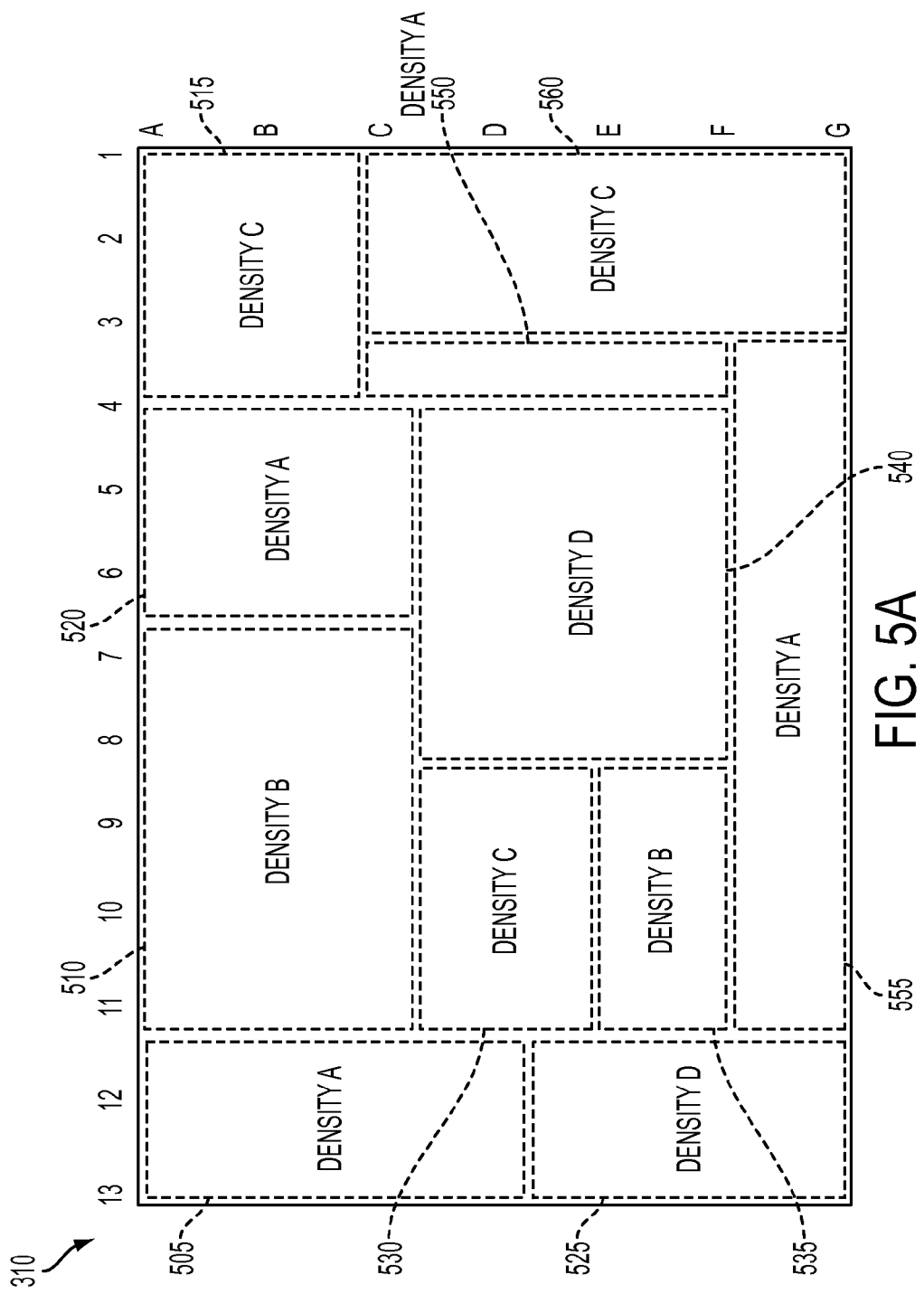
FIG. 5A is an exemplary block diagram of a density layer that corresponds to a map layer in accordance with one possible embodiment of the disclosure.
Figure 5B:
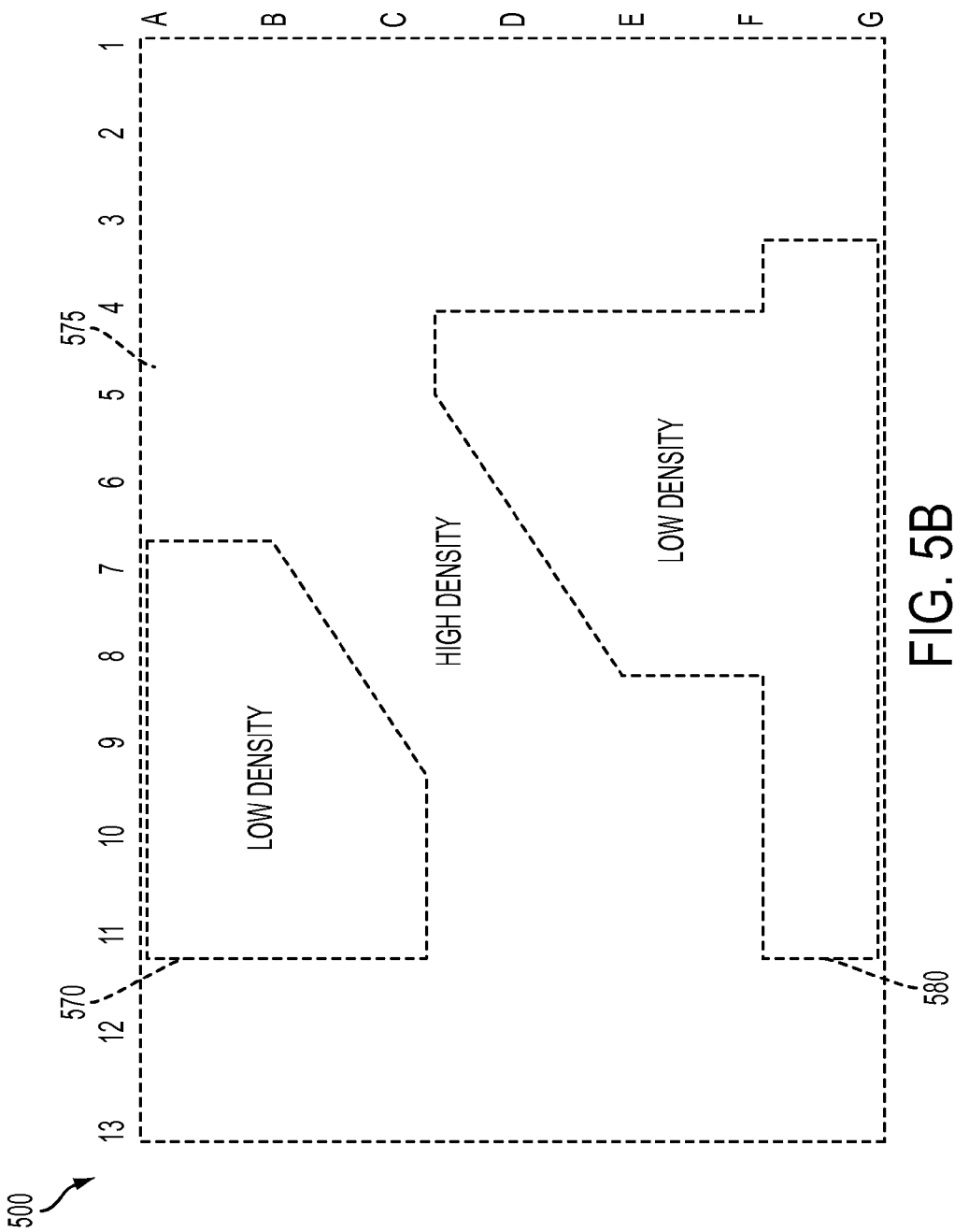
FIG. 5B is an exemplary block diagram of another density layer that corresponds to a map layer in accordance with one possible embodiment of the disclosure.

FIG. 5A is an exemplary block diagram of a density layer that corresponds to a map layer in accordance with one possible embodiment of the disclosure. Using the density level definition information, the floor planning application may augment the map layer 100 and generate the density layer 310. Color and density information may be used to represent the different density levels. For example, red zones may be more densely populated than blue zones. In the current example, the density layer 310 may correspond directly to the zone layer 305 and may include the density information for each zone. For example, the zone 305 may be associated with a density level 505, while the zone 350 may be associated with the density level 550. It may be noted that there are four different density levels A, B, C and D in this example. The number of density levels may vary depending on the implementation. For example, as illustrated in FIG. 3C, there are two density levels: more density and less density. FIG. 5B is an exemplary block diagram of another density layer that includes a high density level and a low density level in accordance with one possible embodiment of the disclosure.

With the map layer 100, the zone layer 305 and the density layer 310, the floor planning application may operate in an automatic mode or in a manual mode. In the automatic mode, the floor planning application is provided with a set of devices and it automatically determines of the placement of these devices as required by the zone definition and density definition. The automatic mode may place a minimum number of devices into the different locations. In the manual mode, the operator may use the interface of the floor planning application and place the devices into the different locations. For some embodiments, feedbacks may be provided by the floor planning application to assist the operator to place of the devices based on the zone definition and the density definition. For example, when the operator places a device in a blue zone (illustrated in FIG. 3B), the floor planning application may provide a feedback that indicates the placement is improper. An example of such feedback is a popup message 605 illustrated in FIG. 6A. When the user places a device in a zone that prevents access by a certain group of users, the floor planning application may provide a feedback that indicates the placement may be constrained. An example of such feedback is a popup message 610 illustrated in FIG. 6B.

Figure 7:
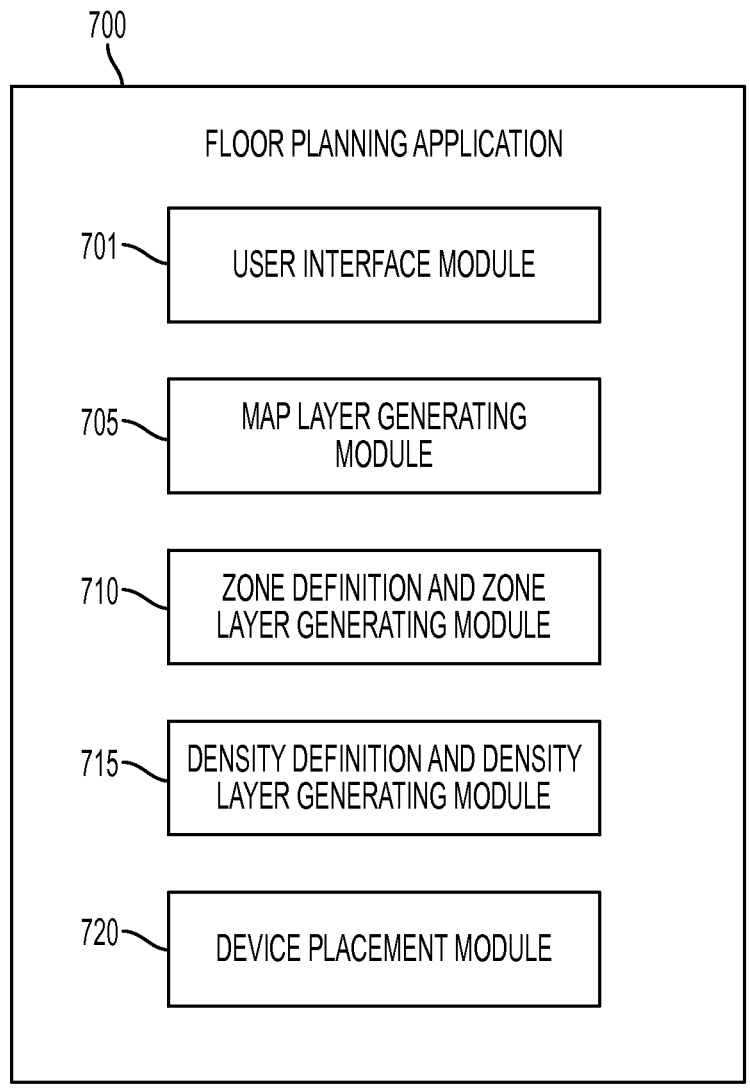
FIG. 7 is an exemplary block diagram of a floor planning application in accordance with one possible embodiment of the disclosure.

FIG. 7 is an exemplary block diagram of a floor planning application in accordance with one possible embodiment of the disclosure. The floor planning application 700 may include an interface module 701 which is configured to enable the operator to interact with the floor planning application 700. For example, the interface module 701 may present options that enable the operator to enter the zone definition and the density information. The floor planning application 700 may also include the map layer generating module 705, the zone layer generating module 710 and the density layer generating module 715. The map layer generating module 705 may be configured to receive information about a building layout and generate a map layer such as the map layer 100. The zone layer generating module 710 may be configured to use the zone definition and the map layer 100 to generate a zone layer such as the zone layer 305. The density layer generating module 715 may be configured to use the density definition and the map layer 100 to generate a density layer such as the density layer 310. The floor planning application 700 may include a device placement module 720 configured to enable a user to place devices in the building layout in the manual mode. Although not shown, the floor planning application 700 may also include other modules that may enable the floor planning application to efficiently operate in the automatic mode and in the manual mode. Further, it may be noted that the functions of one or more of the modules described in FIG. 7 may be combined.

Figure 8:
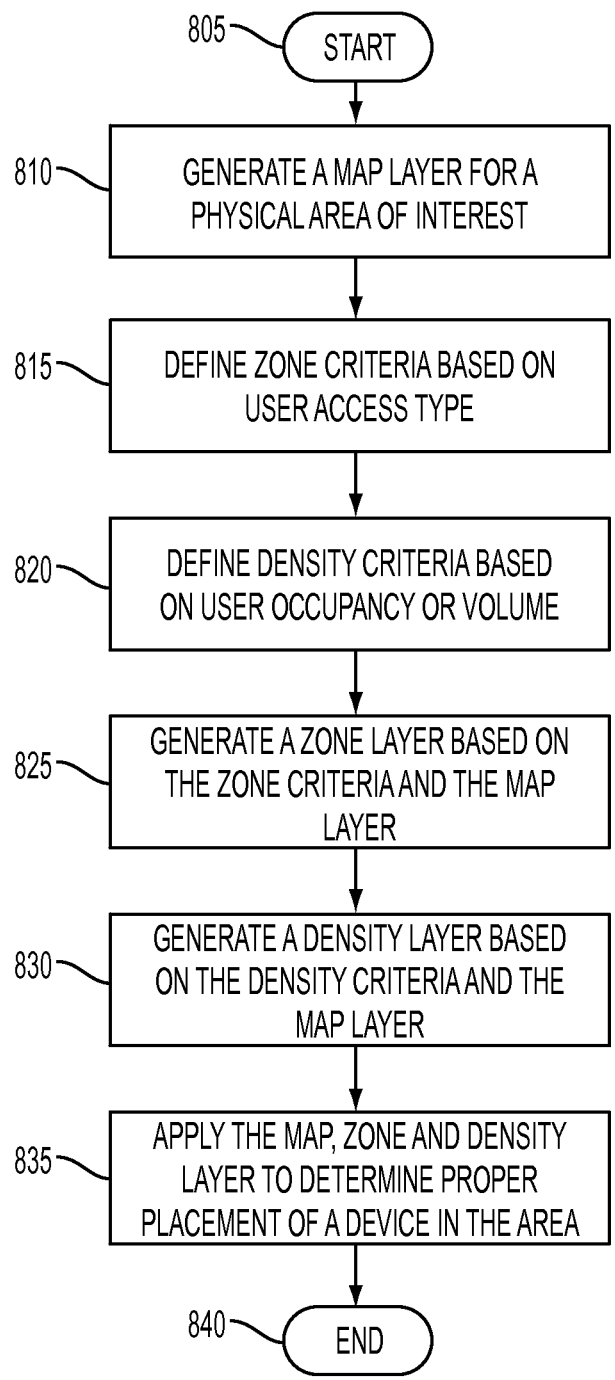
FIG. 8 is exemplary flowchart of the floor planning process in accordance with one possible embodiment of the disclosure.

FIG. 8 is exemplary flowchart of the floor planning process in accordance with one possible embodiment of the disclosure. The process may start at block 805 and may continue to block 810 where a map layer for a building layout may be generated. For example, the building layout may correspond to an area of a building or a floor within a building. A building layout may already exist, and it may be imported to work with the floor planning application 700. The imported building layout may then be converted into the map layer 100.

At block 815, the zone definition 320 may be established. As described above with FIG. 3B, there may be multiple zones, and each zone may be associated with one or more access type. At block 820, the density definition 355 may be established. As described above with FIG. 3C, there may be multiple density areas, and each density area may be associated with a certain number of users, or a volume of activities, or a combination of both.

At block 825, the zone layer 400 is generated. The zone layer 400 may be generated based on the map layer 100 and the zone definition 320. At block 830, the density layer 500 is generated. The density layer 500 may be generated based on the map layer 100 and the density definition 355.

Figure 6A:
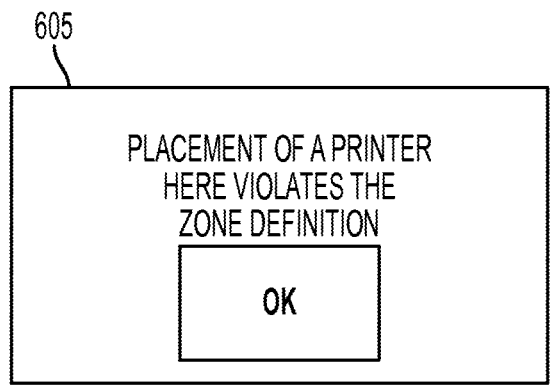
FIG. 6A and FIG. 6B are exemplary block diagrams of messages displayed by the floor planning application in accordance with one possible embodiment of the disclosure.
Figure 6B:
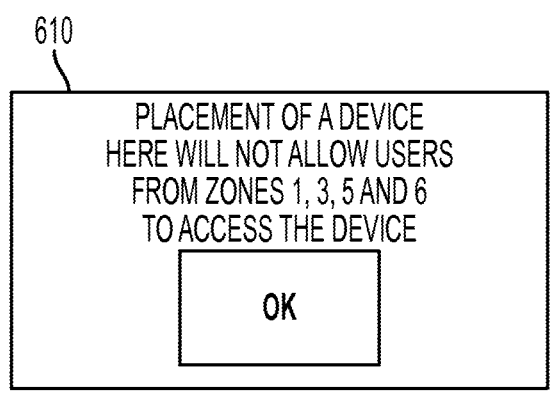

At block 835, the floor planning application 700 may use the combination of the map layer 100, the zone layer 400, and the density layer 500 to determine the proper placement of the devices. As mentioned, the placement of a device in a particular location may be performed using the automatic mode or the manual mode. In the manual mode, the operator may use a mouse to drag and drop an icon associated with a device onto a location of the map layer. The floor planning application 700 may display appropriate information related to that particular placement of the device. Some examples of the information displayed by the floor planning application 700 are illustrated in FIGS. 6A and 6B. The operations of block 835 may repeat when the operator moves a device from one location to another location. Similarly, the operations of the block 835 may repeat for each placement of a new device until all of the devices are placed. The process may then go to step 840 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for determining placement of devices based on a building layout, the method comprising:
   generating, using a processor, a map layer based on a building layout;
   receiving a zone definition, the zone definition including identification of available zones and access characteristics of each of the available zones;
   receiving a density definition, the density definition including identification of available density levels and usage characteristics of each of the density levels; and
   enabling placement of one or more devices in the available zones based on associating the zone definition and the density definition with the map layer.

2. The method of claim 1, further comprising:
   providing an interface to enable an operator to generate the zone definition and the density definition using the processor.

3. The method of claim 1, wherein enabling the placement of one or more devices in the available zones based on associating the zone definition and the density definition with the map layer comprises:
   generating, using the processor, a zone layer based on the zone definition and the map layer;
   generating, using the processor, a density layer based on the density definition and the map layer; and
   using the map layer, the zone layer and the density layer to enable the placement of the one or more devices in the available zones.

4. The method of claim 3, wherein information about the placement of a first device in a first zone of the available zones is provided automatically.

5. The method of claim 3, wherein information about the placement of a first device in a first zone is provided based on the operator selectively placing the first device in the first zone using the interface.

6. The method of claim 5, wherein the information about the placement of the first device in the first zone indicates whether the placement of the first device is consistent with the zone definition.

7. The method of claim 5, wherein the information about the placement of the first device in the first zone indicates whether the placement of the first device in the first zone restricts access to the first device by users located in other zones.

8. The method of claim 1, wherein each of the zones in the zone definition and each of the density levels in the density definition is color coded.

9. The method of claim 1, wherein the zone definition includes information about whether a type of device is not allowed to be placed in a particular zone.

10. The method of claim 1, wherein the access characteristics include security level or access rights that a user needs to have to access a particular zone.

11. The method of claim 1, wherein the density definition includes information about number of users per density unit.

12. A non-transitory computer-readable medium storing instructions for controlling a computing device for determining placement of devices based on a building layout, the instructions comprising:
   generating a map layer based on a building layout;
   generating a zone layer based on a zone definition and the map layer, wherein the zone definition includes identification of available zones and access characteristics of each of the available zones;
   generating a density layer based on a density definition and the map layer, wherein the density definition includes identification of available density levels and usage characteristics of each of the density levels; and
   enabling placement of one or more devices in the available zones based on the map layer, the zone layer and the density layer.

13. The non-transitory computer-readable medium of claim 12, wherein the zone definition includes information about whether type of device is allowed to be placed in a first zone and information about access rights that a user needs to have to access the first zone.

14. The non-transitory computer-readable medium of claim 12, wherein the placement of the one or more devices is either performed automatically or based on input provided by an operator.

15. The non-transitory computer-readable medium of claim 14, further comprising:
   based on the input provided by the operator, providing information about the placement of the one or more devices to indicate whether the placement of the one or more devices is consistent with the zone definition and whether the placement of the one or more devices restricts access to the one or more devices by users located in other zones.

16. The non-transitory computer-readable medium of claim 12, wherein the density definition includes information about number of users per density unit, and wherein the usage characteristics includes usage volume of a device that the users have access to.

17. A system to enable placement of devices using a building layout, the system comprising:

a processor;

a map layer generating module configured to generate a map layer based on a building layout using the processor;

a zone layer generating module coupled with the map layer generating module and configured to generate a zone layer based on a zone definition and the map layer;

a density layer generating module coupled with the map layer generating module and configured to generate a density layer based on a density definition and the map layer; and a device placement module configured to provide information about placement of one or more devices using the map layer, the zone layer and the density layer.

18. The system of claim 17, wherein the zone definition includes information about whether type of device is allowed to be placed in a first zone and information about access rights that a user needs to have to access the first zone.

19. The system of claim 17, wherein the device placement module is configured to provide information about placement of the one or more devices automatically or based on input provided by an operator.

20. The system of claim 17, further comprising a user interface module configured to enable an operator to generate the zone definition and the density definition and to enable the operator to provide the input relating to location in the building layout to place the one or more devices.

* * * * *